J. G. MERRILL.
Improvement in Machines for Turning Metallic-Bands.
No. 131,962.                                  Patented Oct. 8, 1872.
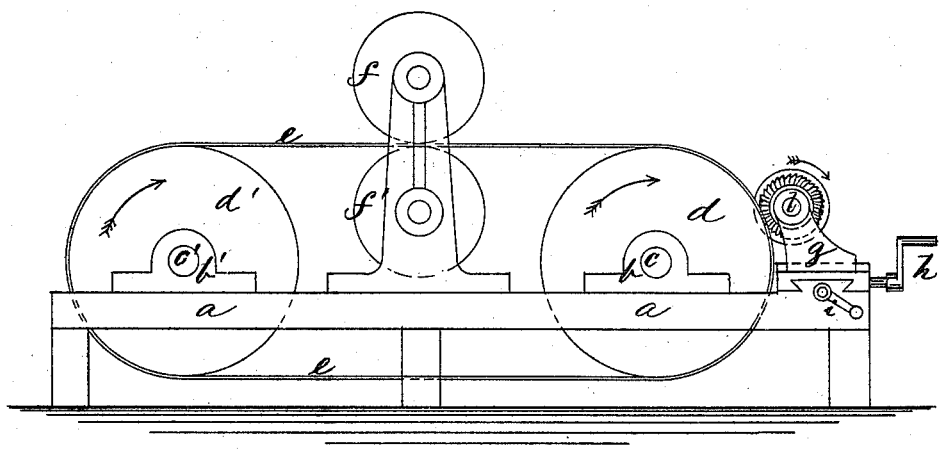
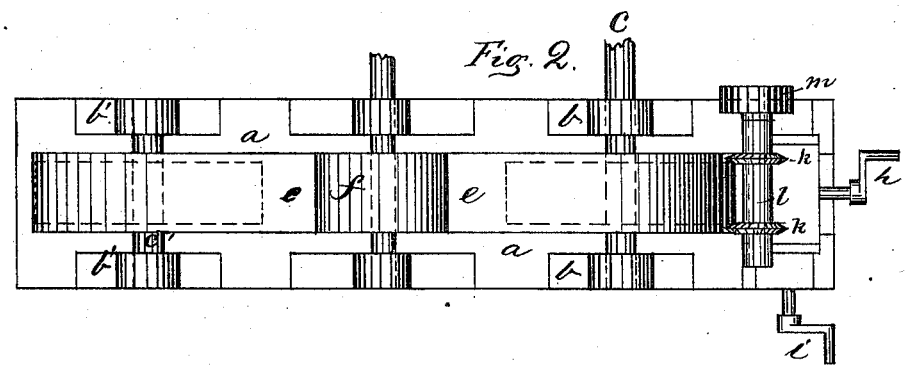
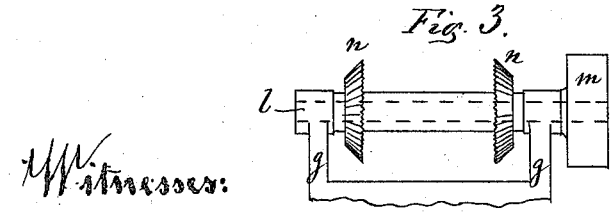
Witnesses:
E. E. Torrey.
F. Sibley
Inventor:
Jonathan G. Merrill.
by Alvan Andrew his atty.

UNITED STATES PATENT OFFICE.

JONATHAN G. MERRILL, OF BOSTON, MASSACHUSETTS.

IMPROVEMENT IN MACHINES FOR TRIMMING METALLIC BANDS.

Specification forming part of Letters Patent No. 131,962, dated October 8, 1872.

*To all whom it may concern:*

Be it known that I, JONATHAN G. MERRILL, of Boston, in the county of Suffolk and State of Massachusetts, have invented certain new and useful Improvements in Machines for Trimming and Cutting the Edges of Endless Metallic Belts or Bands, as will now be fully shown and described.

*Nature and Objects of the Invention.*

The nature of my invention relates to improvements in the mode of cutting and trimming the edges of endless metallic belts or bands, so that the edges shall be parallel with each other and run true on the machine they are intended for; and this my improvement consists in the employment of rotary cutters or mills provided with cutting-teeth on their circumference or sides. The said rotary cutters are brought in contact with the endless belt as it is carried over a pair of wheels or pulleys, as will now be fully shown and described.

On the drawing, Figure 1 is a side elevation; Fig. 2 is a ground plan of my invention; and Fig. 3 is an enlarged end view of the rotary cutting-wheels with their spindle and carriage.

Similar letters refer to similar parts wherever they occur on the different parts of the drawing.

When metallic bands are made, and the ends united together so as to form an endless belt or band, they require to be trimmed on the edges, so that one side shall be parallel with the other, and so that they shall run perfectly true on the faces of the pulleys where they are to be used, and for this purpose bands have heretofore been cut by hand, or by means of a stationary cutting-tool that is held against the endless belt as it travels over the faces of two drums that are supported on a suitable frame. I dispense with such a stationary cutting-tool and use instead of it a revolving spindle, on to which is secured one or more serrated mills that cut through and trim the endless belt as it is brought in contact with one or more of the toothed mills during the travel of the belt over the two carrying-drums, as herein above named.

I do not claim any invention in the use and arrangement of the two carrying-drums, as I am aware that this is old and has been used both for the purpose of trimming and sharpening endless belts and handsaws.

On the drawing, $a$ is a frame, on which is mounted suitable bearings $b\ b'$, serving as supports for the shafts $c\ c'$, as shown. On the shafts $c\ c'$ are attached the drums $d\ d'$, over which the endless belt or band $e$ is carried. One of the drums, $d\ d'$, may be set in motion by power applied to its shaft, and the other one may run loose, as the friction of the endless belt $e$ running over its surface will turn said drum with a corresponding velocity. The drums $d\ d'$ may be so arranged that they can be adjusted from each other so as to tighten the belt suspended over them. Grinding-rollers $f\ f'$ may also be used for the purpose of polishing the outer and inner side of the said endless belt $e$. To one end of the frame $a$ is attached a sliding carriage, $g$, that may be moved lengthwise in the direction of the belt $e$ by means of the crank $h$ and its feed-screw, or it may be moved crosswise over the face of the endless belt by means of the crank $i$ and its feed-screw, or their equivalents, in the same manner as tool-holders are operated on ordinary cutting-lathes.

When it is desired to trim the edges of a belt parallel with each other and true to the plane in which it is to run, I place it on the pulleys $d\ d'$, as shown in Fig. 1, and put the said pulleys so far from each other that the belt will be kept stretched over them in such a manner that, when the pulley $d$ is revolved in the direction as indicated by the arrow, the belt will travel over and with the face of the pulleys by the friction ensuing thereon.

For the purpose of cutting and trimming the edges of the belt, I employ rotary cutting wheels or mills $k\ k$, which I secure to the shaft $l$ in a suitable way. The shaft $l$ is made to rotate in bearings in the upper part of the carriage $g$, in a direction as shown by the arrow on Fig. 1. The shaft $l$ is set in motion by means of power applied to the drum $m$ directly, or by means of gearings, as may be desirable. Ordinarily I use at first V-shaped mills, $k\ k$, as shown on Fig. 2, and feed the revolving-cutters $k\ k$ against the traveling-belt $e$, by which two parallel incisions are gradually cut on the face of the belt, and when the belt is nearly cut through its whole thickness the waste pieces may easily be detached by hand, or I may feed the rotating-mills clear through the whole thickness of the belt, if desirable.

For the purpose of making the edges of the belt smooth and even, I use a secondary pair of mills, n n, as shown in Fig. 3, provided with cutting-teeth on their inside faces, and place the said face-mills just as far from each other as the width of the belt when finished, and operate the said face-mills in the same manner as heretofore described, whereby I am able to obtain the belt finished evenly on both edges, and exactly parallel to the line of its motion.

Other kinds of rotary cutters than what is herein described and shown may be used for the purpose of cutting and trimming belts of a different nature and material; and I do not confine myself to any particular shape of the rotating cutters, as many different-shaped ones may be used under different circumstances; but my invention consists in the employment of rotary cutters of any shape, when combined with the other parts of the machine, as described, for the purpose of cutting and trimming the edges of endless belts or bands, as herein described.

Having thus fully described the nature, construction, and operation of my invention, I wish to secure by Letters Patent, and claim—

In combination with the frame and the belt-carrying rollers, the pair of rotary cutters, the adjustable support on which said cutters are located, and mechanism to impart positive rotary motion to said cutters, substantially as described.

JONATHAN G. MERRILL.

Witnesses:
ALBAN ANDRÉN,
WM. H. HUTCHINSON.